E. R. GILBERT.
NUT LOCK.
APPLICATION FILED OCT. 11, 1910.
984,134.
Patented Feb. 14, 1911.
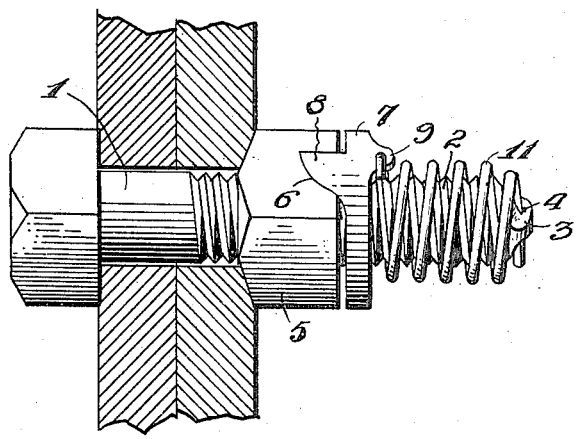
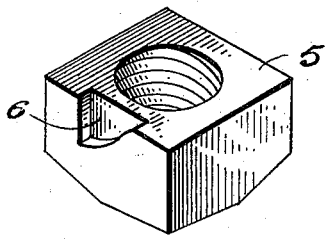
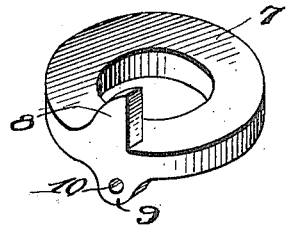
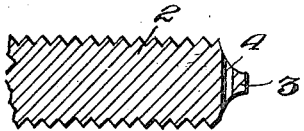
Witnesses
Inventor
Edward R. Gilbert
By his Attorney

UNITED STATES PATENT OFFICE.

EDWARD R. GILBERT, OF KITTANNING, PENNSYLVANIA.

NUT-LOCK.

984,134.     Specification of Letters Patent.      Patented Feb. 14, 1911.

Application filed October 11, 1910. Serial No. 586,524.

*To all whom it may concern:*

Be it known that I, EDWARD R. GILBERT, a citizen of the United States of America, residing at Kittanning, in the county of Armstrong and State of Pennsylvania, have invented certain new and useful Improvements in Nut-Locks, of which the following is a specification, reference being had therein to the accompanying drawing.

This invention relates to nut locks, and the principal object of the same is to provide novel means for locking a nut to a bolt so that relative rotation of the nut and bolt is prevented.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a view in side elevation showing the improved nut lock in practical use. Fig. 2 is a detail perspective view of the nut forming a part of the locking device. Fig. 3 is a similar view of the nut-engaging washer. Fig. 4 is a fragmentary longitudinal sectional view of the bolt forming a part of this invention. Fig. 5 is a detail view of a variation of the invention.

Referring to the accompanying drawings by numerals, it will be seen that the improved nut lock comprises a bolt 1 the threaded shank 2 of which has a reduced and preferably flattened extension 3 at its free end. Said extension 3 is provided with a transverse opening 4.

The nut 5 used in connection with this invention has a recess 6 formed in one of the outer sides thereof. A washer 7 is provided with a laterally projecting lug 8 for interlocking engagement with the side recess of the nut. An ear 9 projects from an opposite portion of the washer and is provided with a transverse opening 10. A spring 11 is coiled about the projected end portion of the bolt 1, one end of said spring being fastened to the reduced end extension 3 of the bolt, the other end of said spring being fastened to the ear 9 of the washer 7.

It will be seen from the foregoing that the washer being interlocked with the nut, and the spring connected between the washer and the bolt, relative rotation of the nut and bolt is prevented.

In the foregoing description the lug 8 of the washer 7 has been shown overlapping one side of the nut 5 and engaging the recess therein. In Fig. 5, the recess has been omitted from the nut 5ª and the washer 7ª has its lug 8ª overlapping and in contact with one side of the nut. In all other respects this form of the invention is the same as that previously described.

What I claim as my invention is:—

1. A nut lock comprising a bolt provided with an end extension, a nut for said bolt provided with a side recess, a washer provided with a lug for engaging said recess and an ear, and a spring coiled about said bolt and having one end fastened to the end extension of the bolt and the other end fastened to the ear of the washer.

2. A nut lock comprising a bolt, a nut therefor provided with a recess, a washer engaging said recess, and a resilient connection between said washer and bolt.

3. A nut lock comprising a bolt, a nut therefor, a washer engaging said nut, and a spring coiled about said bolt and having one end fastened to said bolt and the other end fastened to the washer.

4. A nut lock comprising a bolt, a nut therefor provided with a side recess, a washer provided with means for interlocking engagement with said recess, and a spring coiled about the bolt and fastened to said bolt and washer.

5. A nut lock comprising a bolt, a nut therefor, a washer provided with a lug for overlapping engagement with one side of said nut, and a spring connection between said washer and bolt.

6. A nut lock comprising a bolt, a nut therefor, a washer provided with means for engaging one side of said nut, and a resilient connection between said washer and bolt.

In testimony whereof I hereunto affix my signature in presence of two witnesses.

EDWARD R. GILBERT.

Witnesses:
  GEORGE A. WEST,
  HARRY P. BOOTH.